United States Patent Office 2,950,272
Patented Aug. 23, 1960

2,950,272

POLYOXYALKYLENE ESTERS OF TALL OIL ROSIN ACIDS

Willard H. Kirkpatrick, Sugar Land, Tex., assignor to Visco Products Company, Houston, Tex., a corporation of Delaware No Drawing. Filed Mar. 25, 1957, Ser. No. 648,003

6 Claims. (Cl. 260—104)

This invention relates to surface active compositions and more particularly to new chemical compounds and compositions which are especially useful for resolving water-in-oil emulsions, particularly emulsions of mineral oil and water such as petroleum emulsions commonly encountered in the production, handling and refining of crude mineral oil for the purpose of separating the oil from the water. The invention also relates to the preparation of compounds and compositions which are suitable for the treatment of other water-in-oil type of emulsions wherein the emulsions are produced artificially or naturally and the resolution of the emulsions presents a problem of recovery or disposal.

An object of the present invention is to provide a novel reagent which is water-wettable, interfacial and surface active in order to enable its use as a demulsifier or for such uses where surface active characteristics are necessary or desirable. Other objects will appear hereinafter.

The novel substances provided in accordance with the present invention consist of composition of high molecular weight which are tall oil esters of polyoxyalkylene compounds having a terminal hydroxy group in which the major proportion of the molecular weight is attributable to oxypropylene groups (e.g., oxy-1,2-propylene) or to both oxyethylene and oxypropylene groups in which the weight ratio of oxyethylene to oxypropylene does not exceed 4:1 and is preferably within the range of 4:1 to 1:9. For some surface active uses these esters can have a molecular weight as low as 800. For demulsifying purposes, where the oxyalkylene groups consist of oxyethylene and oxypropylene groups the minimum molecular weight should be at least 1000. For demulsifying purposes, where the oxyalkylene groups consist solely of oxypropylene groups the minimum molecular weight should be at least 1200 and preferably at least 2000. With the foregoing limitations the molecular weights of the compounds provided in accordance with the invention are preferably within the range of 1000 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

The preparation of polyoxyalkylene diols which may be employed as starting materials for the preparation of the corresponding esters has been described in U.S. Patent 2,425,845. This patent describes the preparation of polyoxyalkylene diols prepared from the reaction of ethylene oxide, 1,2-propylene oxide and an aliphatic dihydroxy alcohol. The resulting heteric diols possess viscosity relationships, solubility relationships and fusion temperature relationships entirely unlike those expected, based on comparisons with polyoxyethylene glycols on the one hand and polyoxypropylene glycols on the other. For example, polyoxyethylene glycols of an average molecular weight of about 600 to 800 have the consistency of a semi-fluid, pasty mass. Below this range, the products are clear, normally liquid compositions which are miscible with water in all proportions. At and above the average molecular weight of 800 to 900 the polyoxyethylene glycols are low melting, normally solid compositions having a fusion temperature which increases with increased molecular weights from about 30° C. to a maximum of approximately 60° C. to 65° C. These solid products are miscible with water in all proportions.

Polyoxypropylene glycols are known and available in molecular weights up to 4000. However, the addition products resulting from the reaction of 1,2-propylene oxide with water are referred to in the literature but the properties are not described in a manner which would permit identification of the product. Monoethers of polyoxypropylene glycols have been described in U.S. Patent 2,448,664 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2000 to 3000 are liquids whereas the corresponding polyoxyethylene compounds are solids.

The compositions of this invention wherein oxyethylene and oxypropylene groupings are present in a random or alternate sequence possess characteristics which cannot be secured by a simple blending of polyoxyethylene compounds with polyoxypropylene compounds. It is possible within such a given molecule to secure a molecular weight from 3000 to 20,000 where the product remains liquid at normally prevailing temperatures. Such products are miscible in water and in oils. However, the water solubility decreases as the temperature is raised and at higher temperatures two-phase systems result. These characteristics are unusual and striking and would not be anticipated by careful consideration of the characteristics of polyoxyethylene glycols and polyoxypropylene glycols.

The preferred compositions contemplated for use in accordance with this invention are exemplified by the following structural formula (1)  $R'(OC_nH_{2n})_xR$ wherein R' is an acyl radical of tall oil and R is either hydroxy, oxyalkyl or another acyl radical of tall oil; $n$ is 3 or both 2 and 3 in a single molecule; and $x$ is equal to the number of times $n$ is 3 or is the sum of the number of times $n$ has a value of 2 plus the number of times that $n$ has a value of 3 and the maximum ratio of $n$ having a value of 2 to $n$ having a value of 3 is such that the maximum weight ratio of oxyethylene to oxypropylene does not exceed 4:1, it being further understood that the average molecular weight of said compositions is at least 1000 when both the oxyethylene and oxypropylene groups are present in the same molecule and at least 1200, preferably at least 2000, when the oxyalkylene groups consist solely of oxypropylene groups.

All of the compounds provided in accordance with the invention are characterized by the nucleus

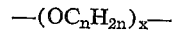 $-(OC_nH_{2n})_x-$ wherein $n$ has a value of 3, or both 2 and 3 in a ratio such that the weight ratio of oxyethylene to oxypropylene does not exceed 4:1, and a major proportion, preferably at least 60% by weight of the compound, is attributable to this nucleus.

The preferred compounds for the purpose of the invention have the following formulae:

(2) 
R'—(OC₂H₄)ₙ(OC₃H₆)ₘ—R where one of the radicals R and R' is a tall oil acyl radical and the other is a radical selected from the group consisting of tall oil acyl radicals, hydroxy and oxyalkyl, $n$ is at least 7, $m$ is at least 5, the total of $n$ and $m$ does not exceed about 100 and the weight ratio of —OC₂H₄— to —OC₃H₆— does not exceed 4:1. More specific illustrations of preferred compounds having such formulae are the mono-tall oil esters in which R' represents a tall oil acyl radical and R represents —OH. Another specific example of such compounds are the mono-tall oil esters in which R' represents the tall oil acyl radical and R represents oxyalkyl, for example, methoxy, ethoxy, propoxy, butoxy, octyloxy, cetyloxy, myricyloxy and homologues thereof, preferably containing 1 to 30 carbon atoms and derived from an aliphatic alcohol by removal of the hydrogen atom of an alcoholic hydroxyl.

(3) 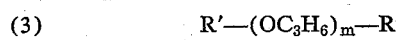
R'—(OC₃H₆)ₘ—R where $m$ is 20 to 70, R' represents a tall oil acyl radical and R represents a radical from the group consisting of hydroxy, oxyalkyl, as defined in connection with Formula 2, supra, and the tall oil acyl radicals.

It will be observed that compounds having the formulae previously described may also be characterized as monoesters of polyoxyalkylene diols, diesters of polyoxyalkylene diols and monoesters of polyoxyalkylene diol monoethers. The substitution of hydrogen by halogen, nitro-, hydroxyl, sulfonic and similar groupings in either the ether or acyl radical does not depart from the scope of this invention for simple substitution products of this nature have been found to be equally satisfactory for the purposes as outlined herein.

In the foregoing formulae it is not intended that the oxyethylene and oxypropylene groups in compounds containing both oxyethylene and oxypropylene groups be present in any specific arrangement. However, it is preferable for the purpose of the invention that the oxyethylene groups and oxypropylene groups be present in alternate or random arrangement which is obtained by the concurrent reaction of ethylene oxide and propylene oxide. Such an alternate or random arrangement is sometimes referred to as "heteric." It can be obtained either by preforming the diol from ethylene oxide and propylene oxide in any suitable way, for example, as described in U.S. Patent 2,425,845, and then reacting the diol with tall oil. Alternately, the ester composition can be produced by adding propylene oxide and ethylene oxide concurrently to tall oil. When the composition is prepared in this manner it is sometimes described as an "adduct."

It is also possible to prepare tall oil esters in accordance with the invention by adding propylene oxide and ethylene oxide sequentially to tall oil. Such esters are characterized by a central hydrophobic group consisting of oxypropylene groups and a terminal series of oxyethylene groups. Similarly, a diol can be prepared by adding oxyethylene groups to a long chain polyoxypropylene glycol and then esterifying the resultant glycol with tall oil. Thus, the invention contemplates the preparation, for example, of compositions containing approximately 35 mols of 1,2-propylene oxide to which had been added 2 to 12 mols of ethylene oxide, the resultant diol being further esterified with tall oil.

The term "tall oil" and the term "tallol" are synonymous for the purpose of the invention. The tall oil may be a crude tall oil but for many purposes it is preferable to use a refined tall oil which is obtained by fractionation of the crude tall oil.

Tall oil is the liquid resin obtained in digesting wood to wood pulp in the paper industry. It is a dark brown viscous liquid containing a crystalline sediment of abietic acid. From the results of several investigators the following principal constituents of tall oil are indicated.

|  | Percent |
|---|---|
| Rosin acids | 30–48 |
| Fatty acids | 45–60 |
| Unsaponifiable matter | 6–12 |

The unsaponifiable portion is a yellow viscous oil containing a waxy or pitchy material. In general, the crude tall oil will contain around 40% to 48% rosin acids, the remainder being primarily oleic, linoleic and linolenic acids. The refined tall oil contains around 30% to 32% rosin acids, the remainder being primarily oleic, linoleic and linolenic acids. A typical crude tall oil has the following specifications:

| | |
|---|---|
| Specific gravity (at 15.5° C.) | .9697 |
| Acid number | 164.0 |
| Saponification number | 173.6 |
| Ester number | 9.4 |
| Percent moisture | 0.0 |
| Percent rosin | 39.2 |
| Percent fatty acids (by difference) | 52.79 |
|     Percent linolenic acid | 19.25 |
|     Percent linoleic acid | 10.5 |
|     Percent oleic acid | 23.04 |
| Unsaponifiable _____percent | 8.01 |
| Iodine number | 148.83 |
| Thiocyanogen-iodine number | 91.1 |
| Percent saturated fatty acids | None |
| Percent unsaturated fatty acids | 100 |
| Titer test _____° C | 5.5 |
| Pour test _____° C | 4.4 |
| Cloud test _____° C | 10–12.8 |

A typical example of a refined tall oil is Acintol D. For practical calculations the molecular weight of tall oil acids can be considered to average around 300 although it may vary, depending upon the particular grade of tall oil, within a range of 270 to 310.

It will be recognized that the compositions of the invention are not pure compounds as such but rather mixtures of compounds due to the fact that tall oil is a mixture of dissimilar carboxy acids.

It is not intended that the foregoing examples illustrated by way of chemical formula cover each and every polyoxyalkylene tall oil ester composition that will satisfactorily resolve water-in-oil emulsions or otherwise function for the purpose of the invention.

These compounds provided in accordance with the invention may also be described as surface active and water-wettable and are non-ionic in that they do not ionize to yield cations and organic anions. Their chemical structure is characterized by the fact that they contain only a single long polyoxyalkylene unit.

The tall oil monoesters and tall oil diesters of polyoxyalkylene diols as well as the esters of polyoxyalkylene diol monoethers are prepared in accordance with recognized and established procedures for such synthesis. As already mentioned, the tall oil can be reacted with the previously formed diol. For the purpose of this invention the presence of a small quantity of residual free acid is not harmful where the product is to be used as a demulsifier. The reaction may be carried out in the presence of a solvent which lends itself to azeotropic distillation. In general the reaction is carried out under such conditions that any aqueous distillate which is removed can be recovered, the amount of such aqueous distillate being an indication of the extent to which the esterification has proceeded. The reaction mass is preferably heated at elevated temperatures until the theoretical amount of water has been secured to indicate the desired amount of esterification.

Both symmetrical and unsymmetrical tall oil esters can be prepared with this procedure.

Where adducts are prepared the ethylene oxide and propylene oxide are introduced into the tallol which preferably contains a small amount of caustic alkali as a catalyst (e.g., .025% NaOH of the finished product) and the temperatures and pressures are adjusted until the desired reaction occurs. In most cases this reaction will occur at temperatures within the range of 130° C. to 165° C. and at pressures of 50 to 70 pounds per square inch gauge (p.s.i.g.). The time required will depend upon the temperatures, pressures and the quantities of the oxides to be reacted. It is preferable for the purpose of the present invention to use mixed ethylene oxide and 1,2-propylene oxide. However, if the oxides are added sequentially, it is preferable first to add the 1,2-propylene oxide and thereafter add the ethylene oxide.

Since, as indicated above, it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

*Example I*

To 1200 parts of a polyoxypropylene glycol having a molecular weight of 1200 contained in a suitable reaction flask there is added 300 parts of tall oil and 200 parts of a hydrocarbon diluent such as SO$_2$ extract. The reaction mixture is heated to 160° C. to 200° C. until an amount of water has distilled over equivalent to the theoretical amount indicated for monoesterification. If it is desired that the monoester be isolated in a substantially pure form, the hydrocarbon vehicle may be removed by heating at slightly elevated temperatures under vacuum.

The diester is prepared in a similar manner by using 600 parts of tall oil instead of the 300 parts required for the preparation of the monoester.

*Example II*

In a suitable reaction flask there is placed 1000 parts of polyoxypropylene glycol having a molecular weight of 2000, 150 parts of tall oil and 200 parts of a suitable hydrocarbon fraction such as SO$_2$ extract. The reaction mixture is heated with the recovery of an aqueous distillate at a temperature between 200° C. and 290° C. until 1 mol of water per mol of tall oil has been removed from the reaction mixture. The product is a mono-tall oil ester of the polyoxypropylene glycol.

In a similar manner the di-tall oil ester is prepared by using 2 mols of tall oil per mol of the glycol and eliminating 2 mols of water from the reaction mixture.

*Example III*

The butylether of polyoxypropylene glycol having a molecular weight of 1200 is prepared by the reaction of butyl bromide with the alkali metal alcoholate of the polyoxypropylene glycol. Much work on this preparation has been done by Hibbert and his co-workers (see e.g., Journal of American Chemical Society, vol 61, page 1905). The equation given below illustrates the reaction involved.

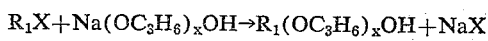

$$R_1X + Na(OC_3H_6)_xOH \rightarrow R_1(OC_3H_6)_xOH + NaX$$

where X represents a halogen atom and $R_1$ represents alkyl, alkenyl, aralkyl, aralkenyl, aryl or cycloalkyl.

To 653 parts of the monobutyl ether of a polyoxypropylene glycol, prepared as above, contained in a suitable reaction flask, there is added 150 parts of tallol (which is essentially an equal mixture of unsaturated acids and resin acids) and 300 parts of SO$_2$ extract. The reaction mixture is heated until an amount of aqueous distillate has been secured which is equivalent to the theoretical amount of water required for complete esterification. This requires a reaction time of approximately 4 hours and temperatures between 170° C. and 220° C. The finished product is the tallol ester of the butylether of the polyoxypropylene glycol.

*Example IV*

A heteric polyoxyalkylene diol having a molecular weight of approximately 1500 is prepared in accordance with the procedure described in U.S. Patent 2,425,845.

To 750 parts of the diol as prepared above there is added 150 parts of tall oil and 100 parts of a hydrocarbon diluent such as SO$_2$ extract. The reaction mixture is heated at 160° C. to 220° C. until an amount of water has distilled over equivalent to the theoretical amount required for esterification. The reaction material is the mono-tall oil ester of the heteric diol.

*Example V*

In a suitable reaction flask there is placed 500 parts of a monobutylether of a heteric polyoxyalkylene diol having a molecular weight of 5000, as prepared in accordance with the procedure described in U.S. Patent 2,425,755, 75 parts of tall oil and 100 parts of SO$_2$ extract. To insure complete reaction the reaction mixture is heated for 4 hours at 200° C. This yields the mono-ether-monoester composition.

*Example VI*

In a suitable reaction flask there is placed 850 parts of a butyl ether of a heteric polyoxyalkylene diol having a molecular weight of approximately 1700 as prepared similarly to the directions of Example V, 150 parts of tall oil and 100 parts of SO$_2$ extract. The reaction mixture is heated at a temperature within the range of 200° C. to 260° C. until a total of 9 parts of aqueous distillate is secured to yield the mono-tall oil ester of the monobutyl heteric diol ether.

*Example VII*

To 220 parts of a hetero polyoxyalkylene diol having a molecular weight of 2200 (wherein the oxypropylene groups constitute 25% by weight and the oxyethylene groups 75% by weight of the oxyalkylene groups present) contained in a suitable reaction flask there is added 30 parts of tall oil and 100 parts of a hydrocarbon diluent such as SO$_2$ extract. The reaction mixture is heated to 255° C. and held at that temperature for a period of 5 hours. After cooling to approximately 100° C., 400 parts of a hydrocarbon diluent such as SO$_2$ extract is added to yield the finished product.

*Example VIII*

1 mol of a heteric polyoxyalkylene diol containing approximately equal weight proportions of ethylene oxide and 1,2-propylene oxide and having an average molecular weight of about 750 is reacted with 1 mol of refined tall oil in benzene at the boiling point of the mixture. The proportions of benzene used in this reaction correspond to 25 cc. per 500 grams of total tall oil and diol. The reaction is carried out under conditions such that an aqueous distillate is eliminated and recovered from the reaction mixture. The temperature is gradually raised until approximately 1 mol of water has been removed from the reaction mixture at a maximum temperature of around 282° C. At this temperature most of the benzene has distilled over. The remainder is removed by continuing the heating at reduced pressure.

The tall oil used in this example is a refined tall oil, Acintol D, containing about 30% rosin acids. The product is a tall oil ester having an average molecular weight of around 1000.

*Example IX*

300 parts of tall oil (Acintol D) are mixed with 1 part of NaOH. 390 parts of 1,2-propylene oxide are placed in a transfer vessel and then added to the tall oil containing the sodium hydroxide at around 145° C. The addition is carried out at a temperature of 150° C. to 160° C. at 100 p.s.i.g. pressure for 4 hours. The mixture is then recycled from the reaction vessel to the transfer vessel for 3 hours at 150° C. to 160° C. 392 parts of ethylene oxide are then charged into a transfer vessel at 120° C. and added to the previously prepared oxypropylated tall oil. The reaction is carried out at 150° C. to 160° C. at 100 p.s.i.g. pressure for 2½ hours and the mixture is recycled at 150° C. to 160° C. for 2 hours to produce the adduct.

*Example X*

The procedure is carried out in a manner similar to that in Example IX except that 385 parts of ethylene oxide are first reacted with the tall oil beginning at a temperature of 135° C. and carrying out the reaction at 150° C. to 160° C. at 100 p.s.i.g. pressure for about 4½ hours. Then 384 parts of 1,2-propylene oxide are added at 150° C. and the reaction is carried out at a temperature of 150° C. to 160° C. at 100 p.s.i.g. pressure for about 4 hours.

*Example XI*

This example illustrates the preparation of a series of tall oil adducts from mixed ethylene oxide and 1,2-propylene oxide. For convenience these adducts are designated L-730-1, L-730-2, L-730-3, and L-730-4.

These adducts are prepared by reacting Acintol D, a refined tall oil containing 30% to 32% rosin acids and the remainder oleic, linoleic and linolenic acids with a mixture of 1,2-propylene oxide and ethylene oxide in varying proportions. The reaction is carried out in a jacketed vessel in the presence of caustic alkali as a catalyst. The caustic alkali is mixed with the refined tall oil in proportions of 30 grams of NaOH per 12 pounds of refined tall oil. The mixed oxides are then introduced into this reaction mixture in a ratio of 20 pounds of ethylene oxide per 19.5 pounds of 1,2-propylene oxide which is approximately a 50–50 weight ratio.

In preparing L-730-1, 24 pounds of the mixed oxides are added to 12 pounds of refined tall oil. The temperature was raised from 134° C. at a pressure of 50 p.s.i. to 164° C. at a pressure of 70 p.s.i. in a period of 4 hours and 40 minutes during which the oxides were gradually introduced into the tall oil mixture containing the caustic alkali catalyst.

In a similar manner, L-730-2 is prepared by adding 23 pounds of the mixed oxides to 9 pounds of refined tall oil starting at a temperature of 155° C. and raising to a temperature of 164° C. in 35 minutes, the pressure at the end of the mixed oxide addition being 60 p.s.i.

In a similar manner, L-730-3 is prepared by adding 18 pounds of mixed oxides to 6 pounds of refined tall oil at a temperature of 153° C. rasing to a temperature of 157° C. in 10 minutes, the pressure at the end of the addition being 70 p.s.i.

In a similar manner, L-730-4 is prepared by adding 16 pounds of mixed oxides to 4 pounds of refined tall oil beginning at a temperature of 153° C. and continuing to a temperature of 158° C. and a final pressure of 70 p.s.i. in 45 minutes.

The resultant products have the following composition:

L-730-1 contains 7 mols of ethylene oxide and 5 mols of 1,2-propylene oxide per mol of tallol.
L-730-2 contains 8.7 mols of ethylene oxide and 6.7 mols of 1,2-propylene oxide per mol of tallol.
L-730-3 contains 10.2 mols of ethylene oxide and 7.7 mols of 1,2-propylene oxide per mol of tallol.
L-730-4 contains 13.7 mols of ethylene oxide and 10.2 mols of 1,2-propylene oxide per mol of tallol.

In Example XI, the compositions described can be given the structural formula (4) $\qquad R'(OC_2H_4)_n(OC_3H_6)_mOH$ where R' represents the tall oil acyl radicals, $n$ is 7 to about 14, and $m$ is 5 to 10. The weight ratio of —$OC_2H_4$— to —$OC_3H_6$— is about 1:1 and said oxyalkylene radicals are present in the molecule in random arrangement.

In Example VIII the formula is the same as (4) with specific values for $n$ and $m$ corresponding to 9 and 7, respectively, or approximately the same molar ratios as in L-730-2.

In Example IX, the general formula of the products is the same as in (4) but the oxypropylene chain is attached to the tall oil acid radicals and the oxyethylene chain is sequentially attached terminally to the oxypropylene chain.

In Example X, the general formula of the products is the same as in (4) but the oxyethylene chain is attached to the tall oil acid radicals and the oxypropylene chain is sequentially attached terminally to the oxyethylene chain.

In order to evaluate the compounds described in the examples, specific tests were made on typical compositions, more particularly the compositions of Examples VIII, IX, X and L-730-2, in Example XI. All of these compositions exhibited somewhat similar solubility properties in water and were soluble in 5% solutions in water at 20° C.

Surface tension tests were made on DuNuoy tensiometer using a 0.01% solution of each of said compositions in distilled water at 20° C. The results obtained were as follows:

| Example: | Dynes per square centimeter |
|---|---|
| VIII | 37.6 |
| IX | 38.9 |
| X | 64.4 |
| XI (L-730-2) | 38.7 |

It will be observed that Example X is quite different in surface activity from the other compositions.

Pour point tests were made and it was determined that the compositions of Examples VIII and XI (L-730-2) were liquid at —10° C. whereas the compositions of Examples IX and X were solids at this temperature.

Tests were also made using the foregoing compositions as demulsifying agents in breaking a water-in-oil petroleum emulsion by adding 0.10 cc. of each chemical to 100 cc. of emulsion at a temperature of around 70° C. and shaking. The results with the composition of Example VIII and the composition of Example XI (L-730-2) were good and about the same in each case. The compositions of Examples IX and X showed some demulsifying properties but the composition of Example IX was inferior as compared with the said compositions of Examples VIII and XI and the composition of Example X was poor.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a byproduct of the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the mid-continent oil fields, including Oklahoma, Illinois, Kansas, the Gulf coast, Louisiana, Southwest Texas and California.

Throughout the specification and claims it will be understood that where the term "tall oil ester of a polyoxyalkylene compound having a terminal hydroxy group" is used, the resultant composition will actually be a mixture of esters of the acids present in tall oil and a polyoxyalkylene compound having a terminal hydroxy group. The statement that the chemical structure is characterized by only a single long polyoxyalkylene unit means that in each of the various esters present in the said tall oil ester there is only a single long polyoxyalkylene unit as distinguished, for example, from a series of polyoxyalkylene units separated by other chemical groups or radicals.

This application is a continuation-in-part of my co-pending application Serial No. 99,333, filed June 15, 1949, now abandoned.

The invention is hereby claimed as follows:

1. An ester having the formula $$R'(OC_nH_{2n})_xR$$

wherein R' is an acyl radical of tall oil rosin acids, R is a member from the group consisting of an oxyacyl radical of a rosin acid found in tall oil, hydroxy and oxyalkyl containing 1 to 30 carbon atoms, $n$ is both 2 and 3 in a single molecule, $x$ is equal to the sum of the number of times $n$ has a value of 2 plus the number of times that $n$ has a value of 3, and the maximum ratio of $n$ having a value of 2 to $n$ having a value of 3 is such that the maximum weight ratio of oxyethylene to oxypropylene does not exceed 4:1, with the further proviso that the average molecular weight of said ester is within the range of 1000 to 7500.

2. An ester as claimed in claim 1 in which R' is an acyl radical of a rosin acid found in tall oil and R is a hydroxy group.

3. An ester as claimed in claim 1 in which R' is an acyl radical of a rosin acid found in tall oil and R is an oxalkyl group in which the alkyl radical contains 1 to 30 carbon atoms.

4. An ester as claimed in claim 1 in which R' is an acyl radical of a rosin acid found in tall oil and R is an oxyacyl radical of a rosin acid found in tall oil.

5. An ester having the following general formula $$R'(OC_2H_4)_n(OC_3H_6)_mOH$$

where R' represents an acyl radical of a rosin acid found in tall oil, $n$ is 7 to 14, $m$ is 5 to 10 and the —OC$_2$H$_4$— and —OC$_3$H$_6$— groups occur in random arrangement, with the further proviso that the average molecular weight is at least 1000.

6. An ester having the following general formula $$R'(OC_2H_4)_n(OC_3H_6)_mOH$$

where R' represents tall oil acyl radicals, $n$ is 7 to 14, $m$ is 5 to 10 and the —OC$_2$H$_4$— and OC$_3$H$_6$— groups occur in random arrangement, with the further proviso that the average molecular weight is at least 1000, said product being further characterized by the fact that it is a liquid at —10 C.

References Cited in the file of this patent
UNITED STATES PATENTS

| | | |
|---|---|---|
| 2,562,878 | Blair | Aug. 7, 1951 |
| 2,586,767 | Wilson | Feb. 19, 1952 |
| 2,588,970 | Esposito | Mar. 11, 1952 |
| 2,606,178 | Kosmin | Aug. 5, 1952 |
| 2,610,966 | Esposito | Sept. 16, 1952 |
| 2,674,619 | Lundsted | Apr. 6, 1954 |
| 2,677,700 | Jackson et al. | May 4, 1954 |